United States Patent
Jain et al.

(10) Patent No.: US 8,165,148 B2
(45) Date of Patent: Apr. 24, 2012

(54) SYSTEM AND METHOD FOR RATE ASSIGNMENT

(75) Inventors: Avinash Jain, San Diego, CA (US); Jelena Damnjanovic, San Diego, CA (US); Tao Chen, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1158 days.

(21) Appl. No.: 10/651,810

(22) Filed: Aug. 28, 2003

(65) Prior Publication Data

US 2005/0004970 A1     Jan. 6, 2005

(51) Int. Cl.
| | |
|---|---|
| *H04L 12/28* | (2006.01) |
| *H04Q 7/00* | (2006.01) |
| *H04B 7/216* | (2006.01) |
| *H04B 7/212* | (2006.01) |
| *H04L 12/403* | (2006.01) |

(52) U.S. Cl. ........ 370/431; 370/329; 370/335; 370/441; 370/445; 370/449

(58) Field of Classification Search .................. 370/232, 370/235, 236.1, 395.21, 395.2, 415, 410, 370/310, 328, 329, 330, 342, 441, 479, 480; 455/412.2, 465.2, 458, 464
See application file for complete search history.

(56) References Cited

U.S. PATENT DOCUMENTS

| | | | |
|---|---|---|---|
| 4,763,322 A | 8/1988 | Eizenhofer | |
| 5,224,120 A | 6/1993 | Schilling | |
| 5,289,463 A * | 2/1994 | Mobasser | 370/230 |
| 5,367,523 A * | 11/1994 | Chang et al. | 370/235 |
| 5,390,165 A * | 2/1995 | Tuch | 370/252 |
| 5,442,625 A | 8/1995 | Gitlin et al. | |
| 5,465,389 A | 11/1995 | Agrawal et al. | |
| 5,490,136 A | 2/1996 | Sereno et al. | |
| 5,490,165 A | 2/1996 | Blakeney et al. | |
| 5,537,410 A | 7/1996 | Li | |
| 5,619,492 A | 4/1997 | Press et al. | |
| 5,640,414 A | 6/1997 | Blakeney, II et al. | |
| 5,648,955 A | 7/1997 | Jensen et al. | |

(Continued)

FOREIGN PATENT DOCUMENTS

EP     0719062     6/1996

(Continued)

OTHER PUBLICATIONS

International Search Report—PCT/US04/000742, International Search Authority—European Patent Office—Jun. 24, 2004.

(Continued)

*Primary Examiner* — Ayaz Sheikh
*Assistant Examiner* — Blanche Wong
(74) *Attorney, Agent, or Firm* — Michelle Gallardo; Nicholas J. Pauley; Jonathan T. Velasco (57) ABSTRACT

A system and method for a time-scalable priority-based scheduler. A flexible scheduling algorithm utilizing variable scheduling durations enables better system capacity utilization. A rate request is transmitted if data arrives in a buffer, data in the buffer exceeds a buffer depth, and sufficient power exists to transmit at the rate requested. A rate assignment responsive to the rate request indicates a scheduled duration and a scheduled rate applicable for the scheduled duration. The scheduled duration is less than or equal to a scheduling period. The scheduling period is an interval of time and after which a scheduler makes a scheduling decision. The scheduling period is variable and the scheduled duration is variable.

35 Claims, 6 Drawing Sheets

Parameters associated in mobile station scheduling on RL

U.S. PATENT DOCUMENTS

| Patent No. | | Date | Inventor(s) | |
|---|---|---|---|---|
| 5,729,534 | A | 3/1998 | Jokinen et al. | |
| 5,734,646 | A | 3/1998 | I et al. | |
| 5,784,358 | A * | 7/1998 | Smith et al. | 370/230 |
| 5,784,695 | A | 7/1998 | Upton et al. | |
| 5,839,056 | A | 11/1998 | Hakkinen | |
| 5,914,950 | A * | 6/1999 | Tiedemann, Jr. et al. | 370/348 |
| 5,923,650 | A | 7/1999 | Chen et al. | |
| 6,018,515 | A * | 1/2000 | Sorber | 370/229 |
| 6,064,678 | A | 5/2000 | Sindhushayana et al. | |
| 6,088,324 | A | 7/2000 | Sato | |
| 6,167,270 | A * | 12/2000 | Rezaiifar et al. | 455/442 |
| 6,173,187 | B1 | 1/2001 | Salonaho et al. | |
| 6,173,197 | B1 | 1/2001 | Boggett et al. | |
| 6,205,129 | B1 | 3/2001 | Esteves et al. | |
| 6,317,234 | B1 * | 11/2001 | Quayle | 398/9 |
| 6,335,922 | B1 | 1/2002 | Tiedemann, Jr. et al. | |
| 6,335,923 | B2 | 1/2002 | Kubo et al. | |
| 6,337,983 | B1 | 1/2002 | Bonta et al. | |
| 6,366,761 | B1 * | 4/2002 | Montpetit | 455/12.1 |
| 6,396,804 | B2 | 5/2002 | Odenwalder | |
| 6,400,699 | B1 | 6/2002 | Airy et al. | |
| 6,418,320 | B2 | 7/2002 | Yoshida et al. | |
| 6,473,624 | B1 | 10/2002 | Corbett et al. | |
| 6,549,525 | B2 | 4/2003 | Odenwalder | |
| 6,560,211 | B2 | 5/2003 | Esteves et al. | |
| 6,594,241 | B1 * | 7/2003 | Malmlof | 370/329 |
| 6,597,705 | B1 | 7/2003 | Rezaiifar et al. | |
| 6,633,552 | B1 | 10/2003 | Ling et al. | |
| 6,633,554 | B1 | 10/2003 | Dalal | |
| 6,728,233 | B1 | 4/2004 | Park et al. | |
| 6,741,562 | B1 | 5/2004 | Keirouz et al. | |
| 6,741,862 | B2 | 5/2004 | Chung et al. | |
| 6,782,271 | B2 | 8/2004 | Huh et al. | |
| 6,798,736 | B1 | 9/2004 | Black et al. | |
| 6,804,219 | B2 * | 10/2004 | Koo et al. | 370/335 |
| 6,807,426 | B2 * | 10/2004 | Pankaj | 455/453 |
| 6,816,476 | B2 | 11/2004 | Kim et al. | |
| 6,842,624 | B2 | 1/2005 | Sarkar et al. | |
| 6,963,746 | B2 | 11/2005 | Sato et al. | |
| 6,967,998 | B1 | 11/2005 | Chen et al. | |
| 7,010,316 | B2 | 3/2006 | Chen | |
| 7,031,741 | B2 | 4/2006 | Lee et al. | |
| 7,042,858 | B1 | 5/2006 | Ma et al. | |
| 7,065,060 | B2 | 6/2006 | Yun et al. | |
| 7,079,522 | B1 | 7/2006 | Kim et al. | |
| 7,085,239 | B2 | 8/2006 | Ling et al. | |
| 7,133,460 | B2 | 11/2006 | Bae et al. | |
| 7,171,214 | B2 * | 1/2007 | Shively et al. | 455/452.1 |
| 7,200,127 | B1 | 4/2007 | Lee et al. | |
| 7,206,296 | B2 | 4/2007 | Miyoshi et al. | |
| 7,215,653 | B2 | 5/2007 | Kim et al. | |
| 7,236,467 | B2 | 6/2007 | Kono | |
| 7,245,600 | B2 | 7/2007 | Chen | |
| 7,289,473 | B1 | 10/2007 | Padovani et al. | |
| 7,411,923 | B2 | 8/2008 | Attar et al. | |
| 7,411,974 | B2 | 8/2008 | Attar et al. | |
| 7,486,961 | B2 | 2/2009 | Lee et al. | |
| 7,626,989 | B2 | 12/2009 | Raitola et al. | |
| 7,630,321 | B2 * | 12/2009 | Jain et al. | 370/252 |
| 2002/0093976 | A1 | 7/2002 | Razoumov et al. | |
| 2002/0136186 | A1 | 9/2002 | Watanabe | |
| 2002/0147025 | A1 | 10/2002 | Savas | |
| 2002/0160782 | A1 | 10/2002 | Joshi et al. | |
| 2002/0176380 | A1 * | 11/2002 | Holtzman et al. | 370/329 |
| 2003/0007466 | A1 * | 1/2003 | Chen | 370/328 |
| 2003/0125040 | A1 | 7/2003 | Walton et al. | |
| 2003/0142732 | A1 | 7/2003 | Moshavi et al. | |
| 2004/0037565 | A1 | 2/2004 | Young et al. | |
| 2004/0052212 | A1 * | 3/2004 | Baillargeon | 370/235 |
| 2005/0014474 | A1 | 1/2005 | Jitsukawa et al. | |
| 2005/0107106 | A1 | 5/2005 | Valkealahti et al. | |
| 2005/0147063 | A1 | 7/2005 | Pi et al. | |

FOREIGN PATENT DOCUMENTS

| | | |
|---|---|---|
| EP | 0782364 | 7/1997 |
| EP | 1067704 | 10/2001 |
| KR | 20010102373 | 11/2001 |
| KR | 20020083942 | 11/2002 |
| RU | 2233045 | 7/2004 |
| TW | 318983 | 11/1997 |
| TW | 453056 | 9/2001 |
| WO | WO1996/10305 | 0/0419 |
| WO | WO1994/01975 | 1/1994 |
| WO | WO1995/07578 | 3/1995 |
| WO | WO1995/24102 | 9/1995 |
| WO | WO1996/10320 | 4/1996 |
| WO | WO1996/37081 | 11/1996 |
| WO | WO9909779 A1 | 2/1999 |
| WO | 00025485 | 5/2000 |
| WO | 00048336 | 8/2000 |
| WO | WO0048669 A1 | 8/2000 |
| WO | 00074289 | 12/2000 |
| WO | 0143485 | 6/2001 |
| WO | 02065664 | 8/2002 |

OTHER PUBLICATIONS

Written Opinion—PCT/US04/000742, International Search Authority—European Patent Office—Jun. 24, 2004.

Written Opinion—PCT/US04/000742, IPEA—US—Oct. 19, 2006.

Alan Gatherer, Edgar Auslander: "The Application of Programmable DSPs in Mobile Communications" [Online] Apr. 18, 2002, Wiley, England.

Attar R A et al: "A reverse link outer-loop power control algorithm for cdma2000 1xEV systems" ICC 2002. 2002 IEEE International Confernce on Communications, NY, vol. 1, Apr. 28, 2002, pp. 573-578.

Avinash Jain: "IS-2000 Release 0 Simulation Configuration Specification, Rev. 2".

Ramjee Prasasd, Werner Mohr, Wlater Konhauser: "Third Generation Mobile Communication Systems" Jan. 1, 2000, pp. 245, 247.

"Upper Layer (layer3) Signaling standard for cdma2000 spread spectrum systems" TIA/EIA Interim Standard IS-2000.5-A-2.

TIA/EIA/IS-2000.2-C, "Physical Layer Standard for cdma2000 Spread Spectrum Systems—Release C," May 28, 2002.

Avinash Jain: "Reverse Link System Stimulation Results for IS-2000 Release A Using DVRL Evaluation Framework", 3GPP2, Dec. 3, 2001 pp. 1-77 XP002526313.

Telecommunication Industry Association: "Physical Layer Standard for CDMA2000 Spread Spectrum Systems", May 1, 2002.

"Upper Layer (layer3) Signaling standard for cdma2000 spread spectrum systems"TIA/EIA Interim Standard IS-2000,5-A-2, Feb. 2004.

Avinash Jain: "IS-2000 Release C Simulation Configuration Specification. Rev. 7"3GPP2, Dec. 9, 2002 (Dec. 9, 2002), pp. 1-19.

Damnjanovic et al., "Scheduling the cdrna2000 Reverse Link", IEEE 56th Vehicular Technology Conference Proceedings, Vancouver, Canada, Sept. 24-27, 2002, vol. 1, pp. 386-390 XP01608583.

Avinassh Jain: "A time-scaleable priority-based scheduler for IS-2000 Release C Reverse link baseline simulations, "3GPP2, 3GPP2-TSG-C30-20030113-xxx, Jan. 13, 2002, pp. 1-9.

* cited by examiner

PRIOR ART

FIG. 1

Set point adjustment due to rate transitions on R-SCH
Figure 2

Scheduling Delay Timing
Figure 3

Parameters associated in mobile station scheduling on RL
Figure 4

SYSTEM AND METHOD FOR RATE ASSIGNMENT

CLAIM OF PRIORITY UNDER 35 U.S.C. §119

The present Application for Patent claims priority to Provisional Application No. 60/439,989 entitled "System and Method for a Time-Scalable Priority-Based Scheduler" filed Jan. 13, 2003, and assigned to the assignee hereof and hereby expressly incorporated by reference herein.

REFERENCE TO CO-PENDING APPLICATIONS FOR PATENT

The present invention is related to the following Applications for Patent in the U.S. Patent & Trademark Office:

"System and Method for Rate Assignment" by Avinash Jain, having Ser. No. 10/640,77, filed Aug. 13, 2003, and assigned to the assignee hereof, and which is expressly incorporated by reference herein.

"System and Method for Multilevel Scheduling" by Avinash Jain, having Ser. No. 10/640,720, filed Aug. 13, 2003, and assigned to the assignee hereof, and which is expressly incorporated by reference herein.

BACKGROUND

1. Field

The present disclosed embodiments relate generally to wireless communications, and more specifically to a time-scalable priority-based scheduler in a communication system.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems designed to allow multiple users to access a common communications medium have been developed for such cellular systems. These modern communication systems may be based on code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In FDMA systems, the total frequency spectrum is divided into a number of smaller sub-bands and each user is given its own sub-band to access the communication medium. Alternatively, in TDMA systems, each user is given the entire frequency spectrum during periodically recurring time slots. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named CDMA communication systems and standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (C/I) from a mobile station, very fast scheduling, and scheduling for services that have more relaxed delay requirements. An example of such a data-only communication system using these techniques, is the high data rate (HDR) system that conforms to the TIA/EIA/IS-856 standard (the IS-856 standard).

In contrast to the other above named standards, an IS-856 system uses the entire spectrum available in each cell to transmit data to a single user at one time. One factor used in determining which user is served is link quality. By using link quality as a factor for selecting which user is served, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1x-EVDV", submitted to 3GPP2 as document number C50-20010820-012, Aug. 20, 2001. These are hereinafter referred to as the 1xEV-DV proposal.

Multi-level scheduling is useful for more efficient capacity utilization on the reverse link. In a typical scenario when the scheduling is performed at a central entity like a base station controller (BSC), long scheduling periods are used because of
  a) Large random backhaul delays given the centralized nature of scheduling; and
  b) Request/grant overhead with multiple mobile stations (MSs) being scheduled simultaneously.

However long scheduling durations of fixed rate have following disadvantages:
  mobile stations with small amount of data in their buffer are not able to transmit at high rates for long scheduled durations. With small rate assignments, capacity utilization is not as effective;

long scheduling durations increase the probability of data-limited disable transmissions (DTXs) for longer periods, hence wasting capacity; and average packet delay is large.

Thus, a flexible scheduling algorithm utilizing variable scheduling durations may be more useful to maximize system capacity utilization.

SUMMARY

Embodiments disclosed herein provide a system and method for a time-scalable priority-based scheduler in a communication system.

In an aspect, a method of scheduling comprises transmitting a rate request if data arrives in a buffer, data in the buffer exceeds a buffer depth, and sufficient power exists to transmit at the rate requested, receiving the rate request, transmitting a rate assignment responsive to the rate request, the rate assignment indicating a scheduled duration and a scheduled rate applicable for the scheduled duration, receiving the rate assignment, and transmitting data, the transmitting responsive to the rate assignment, wherein the data is transmitted for the scheduled duration at the scheduled rate.

In an aspect, a method of scheduling comprises receiving a rate request, transmitting a rate assignment responsive to the rate request, the rate assignment indicating a scheduled duration and a scheduled rate applicable for the scheduled duration, and receiving data for the scheduled duration at the scheduled rate.

In another aspect, a method of transmitting data comprises transmitting a rate request if data arrives in a buffer, data in the buffer exceeds a buffer depth, and sufficient power exists to transmit at the rate requested, receiving a rate assignment responsive to the rate request, the rate assignment indicating a scheduled duration and a scheduled rate applicable for the scheduled duration, and transmitting data, the transmitting responsive to the rate assignment, wherein the data is transmitted for the scheduled duration at the scheduled rate.

In an aspect, the scheduled duration is an integer multiple of a minimum scheduled duration. In an aspect, the scheduled duration is less than or equal to a scheduling period, wherein the scheduling period is an interval of time after which a scheduler makes a scheduling decision. In an aspect, the scheduling period is variable. In an aspect, the scheduled duration is variable.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
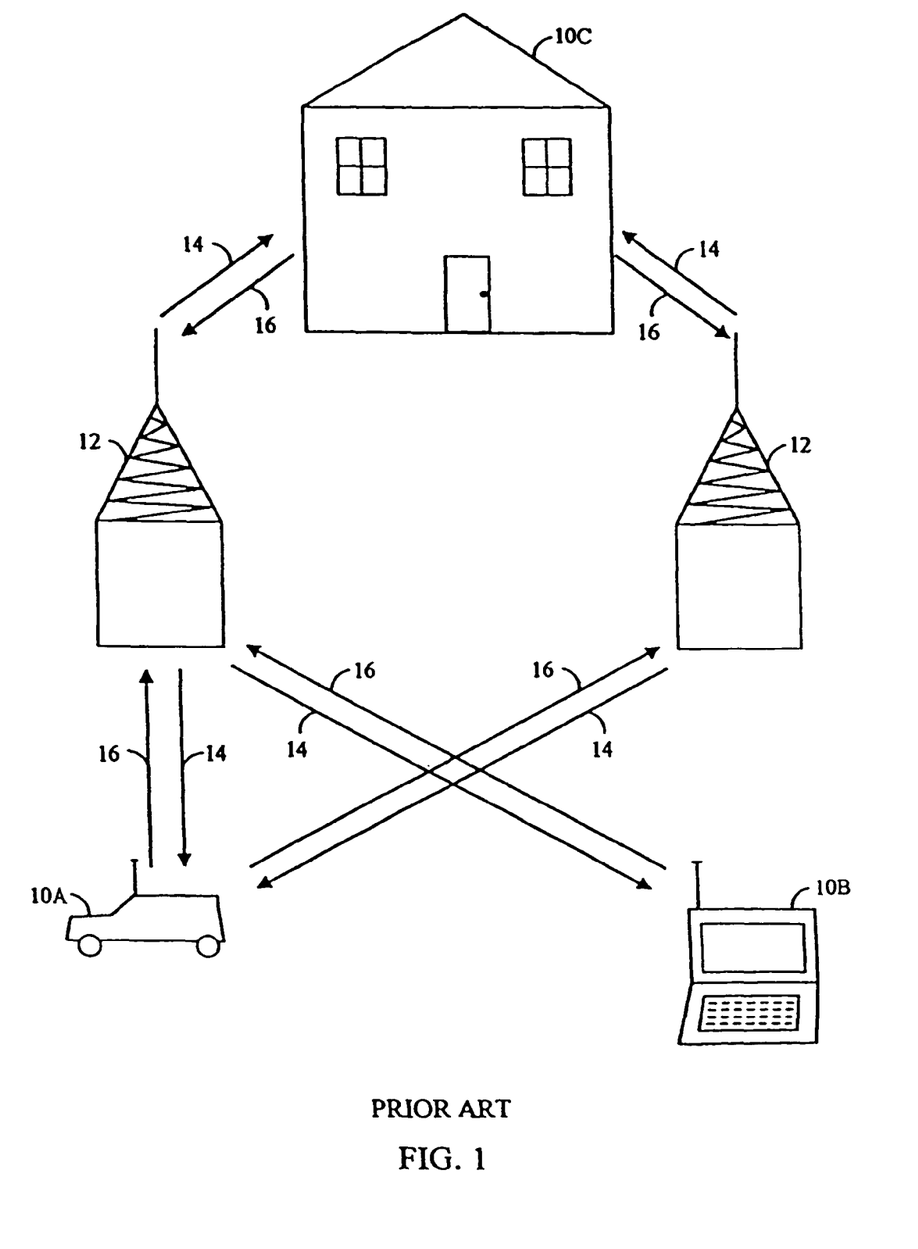
FIG. 1 exemplifies an embodiment of a wireless communication system with three mobile stations and two base stations.

A wireless communication system may comprise multiple mobile stations and multiple base stations. FIG. 1 exemplifies an embodiment of a wireless communication system with three mobile stations 10A, 10B and 10C and two base stations 12. In FIG. 1, the three mobile stations are shown as a mobile telephone unit installed in a car 10A, a portable computer remote 10B, and a fixed location unit 10C such as might be found in a wireless local loop or meter reading system. Mobile stations may be any type of communication unit such as, for example, hand-held personal communication system units, portable data units such as a personal data assistant, or fixed location data units such as meter reading equipment. FIG. 1 shows a forward link 14 from the base station 12 to the mobile stations 10 and a reverse link 16 from the mobile stations 10 to the base stations 12.

As a mobile station moves through the physical environment, the number of signal paths and the strength of the signals on these paths vary constantly, both as received at the mobile station and as received at the base station. Therefore, a receiver in an embodiment uses a special processing element called a searcher element, that continually scans the channel in the time domain to determine the existence, time offset, and the signal strength of signals in the multiple path environment. A searcher element is also called a search engine. The output of the searcher element provides the information for ensuring that demodulation elements are tracking the most advantageous paths.

A method and system for assigning demodulation elements to a set of available signals for both mobile stations and base stations is disclosed in U.S. Pat. No. 5,490,165 entitled "DEMODULATION ELEMENT ASSIGNMENT IN A SYSTEM CAPABLE OF RECEIVING MULTIPLE SIGNALS," issued Feb. 6, 1996, and assigned to the Assignee of the present.

When multiple mobiles transmit simultaneously, the radio transmission from one mobile acts as interference to the other mobile's radio transmission, thereby limiting throughput achievable on the reverse link (also called the uplink). For efficient capacity utilization on the reverse link, centralized scheduling at the base station has been recommended in U.S. Pat. No. 5,914,950 entitled "METHOD AND APPARATUS FOR REVERSE LINK RATE SCHEDULING," issued Jun. 22, 1999, and U.S. Pat. No. 5,923,650 entitled "METHOD AND APPARATUS FOR REVERSE LINK RATE SCHEDULING," issued Jul. 13, 1999, both of which are assigned to the Assignee of the present.

In an exemplary embodiment, multi-level scheduling is performed. In an embodiment, multi-level scheduling comprises base station level scheduling, selector level scheduling, and/or network level scheduling.

In an embodiment, a detailed design of a flexible scheduling algorithm is based on fundamental theoretical principles that limit reverse-link system capacity, while using existing network parameters available or measured by a base station.

In an embodiment, base-station estimation of each mobile's capacity contribution is based on a measured signal-to-noise ratio (Snr) or a pilot energy over noise plus interference ratio (Ecp/(Io+No)), collectively called (Ecp/Nt), given the current rate of transmission. Measurement of pilot Ecp/Nt from all fingers in multi-path scenario is disclosed in U.S. application Ser. No. 10/011,519 entitled "METHOD AND APPARATUS FOR DETERMINING REVERSE LINK LOAD LEVEL FOR REVERSE LINK DATA RATE SCHEDULING IN A CDMA COMMUNICATION SYSTEM," filed Nov. 5, 2001, and assigned to the assignee of the present invention.

From the measurement of pilot Ecp/Nt at current rates on different channels, capacity contribution of a mobile is estimated at new rates on these channels.

In an embodiment, mobile requests for rate allocation are prioritized. A list of all mobiles that a scheduler is responsible for scheduling is maintained depending on which level the scheduling is performed. In an embodiment, there is one list for all the mobiles. Alternatively, there are two lists for all mobiles. If the scheduler is responsible for scheduling all the base stations a mobile has in its Active Set, then the mobile belongs to a First List. A separate Second List may be maintained for those mobiles that have a base station in the Active Set that the scheduler is not responsible for scheduling. Prioritization of mobile rate requests is based on various reported, measured or known parameters that maximize system throughput, while allowing for mobile fairness as well as their importance status.

In an embodiment, Greedy Filling is used. In Greedy Filling, a highest priority mobile obtains the available sector capacity. A highest rate that can be allocated to the mobile is determined as the highest rate that the mobile can transmit at. In an embodiment, the highest rates are determined based on measured SNR. In an embodiment, the highest rates are determined based on Ecp/Nt. In an embodiment, the highest rates are determined based also on limiting parameters. In an embodiment, the highest rate is determined by a mobile's buffer estimate. The choice of a high rate decreases the transmission delays and decreases interference that the transmitting mobile observes. Remaining sector capacity can be allocated to the next lower priority mobile. This methodology helps in maximizing the gains due to interference reduction while maximizing the capacity utilization.

By the choice of different prioritization functions, the Greedy Filling algorithm can be tuned to a conventional round-robin, proportionally fair or most unfair scheduling based on a specified cost metric. Under the class of scheduling considered, the above method helps aid maximum capacity utilization.

The mobile station initiates a call by transmitting a request message to the base station. Once the mobile receives a channel assignment message from base station, it can use a logical dedicated channel for further communication with the basestation. In a scheduled system, when the mobile station has data to transmit, it can initiate a high-speed data transmission on the reverse link by transmitting a request message on the reverse link.

Rate request and rate allocation structure currently specified in IS 2000 Release C is considered. However, it would be apparent to those skilled in the art that the scope of the design is not limited to IS 2000. It would be apparent to those skilled in the art, that embodiments may be implemented in any multiple access system with a centralized scheduler for rate allocation.

Mobile Station Procedures

In an embodiment, mobile stations (MS) at least support the simultaneous operation of the following channels:
1. Reverse Fundamental Channel (R-FCH)
2. Reverse Supplemental Channel (R-SCH)

Reverse Fundamental Channel (R-FCH): When a voice-only MS has an active voice-call, it is carried on the R-FCH. For data-only MS, R-FCH carries signaling and data. Exemplary R-FCH channel frame size, coding, modulation and interleaving are specified in TIA/EIA-IS-2000.2, "Mobile Station-Base Station Compatibility Standard for Dual-Mode Wideband Spread Spectrum Cellular System," June, 2002.

In an exemplary embodiment, R-FCH at a null rate is used for outer-loop power control (PC), when an MS is not transmitting voice, data or signaling on R-FCH. Null rate means a lowest rate. R-FCH at a lowest rate may be used to maintain outer-loop power control even when there is no transmission on R-SCH.

Reverse Supplemental Channel (R-SCH): The MS supports one R-SCH for packet data transmissions in accordance with an embodiment. In an exemplary embodiment, the R-SCH uses rates specified by radio configuration (RC3) in TIA/EIA-IS-2000.2.

In an embodiment where only single data channel (R-SCH) is supported, the signaling and power control can be done on a control channel. Alternatively, signaling can be carried over R-SCH and outer-loop PC can be carried on R-SCH whenever it is present.

In an embodiment, the following procedures are followed by mobile stations:
  Multiple Channel Adjustment Gain
  Discontinuous Transmission and Variable Supplemental Adjustment Gain
  Overhead transmission of R-CQICH and other control channels
  Closed-loop Power Control (PC) command
  Rate request using a Supplemental Channel Request Mini Message (SCRMM) on a 5-ms R-FCH or a Supplemental Channel Request Message (SCRM) on a 20-ms R-FCH Multiple Channel Adjustment Gain: When the R-FCH and the R-SCH are simultaneously active, multiple channel gain table adjustment as specified in TIA/EIA-IS-2000.2 is performed to maintain correct transmission power of the R-FCH. The traffic-to-pilot (T/P) ratios for all channel rate are also specified in the Nominal Attribute Gain table in appendix A as Nominal Attribute Gain values. Traffic-to-pilot ratio means the ratio of traffic channel power to pilot channel power.

Discontinuous Transmission and Variable Supplemental Adjustment Gain: The MS may be assigned an R-SCH rate by a scheduler during each scheduling period. When the MS is not assigned an R-SCH rate, it will not transmit anything on the R-SCH. If the MS is assigned to transmit on the R-SCH, but it does not have any data or sufficient power to transmit at the assigned rate, it disables transmission (DTX) on the R-SCH. If the system allows it, the MS may be transmitting on the R-SCH at a rate lower than the assigned one autonomously. In an embodiment, this variable-rate R-SCH operation is accompanied by the variable rate SCH gain adjustment as specified in TIA/EIA-IS-2000.2. R-FCH T/P is adjusted assuming the received pilot SNR is high enough to support the assigned rate on R-SCH.

Overhead transmission of R-CQICH and other control channels: A data-only MS transmits extra power on CQICH and/or other control channels at a CQICH-to-pilot (or control-to-pilot) (C/P) ratio with multi-channel gain adjustment performed to maintain correct transmission power of the R-CQICH (or control channels). (C/P) value may be different for MS in soft-handoff from those not in soft handoff. (C/P) represent the ratio of total power used by the control channels to the pilot power without multichannel gain adjustment.

Closed-loop Power Control (PC) command: In an embodiment, an MS receives one PC command per power control group (PCG) at a rate of 800 Hz from all base stations (BSs) in the MS's Active Set. A PCG is a 1.25 ms interval on the Reverse Traffic Channel and the Reverse Pilot Channel. Pilot power is updated by +−1 dB based on an "Or-of-Downs" rule, after combining of the PC commands from co-located BSs (sectors in a given cell).

Rate request is done with one of two methods. In a first method, rate request is performed using a Supplemental Channel Request Mini Message (SCRMM) on a 5-ms R-FCH as specified in TIA/EIA-IS-2000.5.

Supplemental Channel Request Mini Message (SCRMM) on a 5-ms R-FCH: In an embodiment, each SCRMM transmission is 24 bits (or 48 bits with the physical layer frame overhead in each 5-ms FCH frame at 9.6 kbps).

The MS sends the SCRMM in any periodic interval of 5 ms. If a 5-ms SCRMM needs to be transmitted, the MS interrupts its transmission of the current 20-ms R-FCH frame, and instead sends a 5-ms frame on the R-FCH. After the 5-ms frame is sent, any remaining time in the 20-ms period on the R-FCH is not transmitted. The discontinued transmission of the 20-ms R-FCH is re-established at the start of next 20-ms frame.

In a second method, rate request is performed using a Supplemental Channel Request Message (SCRM) on a 20-ms R-FCH.

Depending on different embodiments, different information can be sent on a request message. In IS2000, Supplemental Channel Request Mini Message (SCRMM) or a Supplemental Channel Request Message (SCRM) is sent on the reverse-link for rate request.

In an embodiment, the following information shall be reported by the MS to the BS on each SCRM/SCRMM transmission:
  Maximum Requested Rate
  Queue Information Maximum Requested Rate: It can be the maximum data rate an MS is capable of transmitting at the current channel conditions leaving headroom for fast channel variations. An MS may determine its maximum rate using the following equation:

$$R_{max}(power) = \underset{R}{\operatorname{argmax}} \left\{ \begin{array}{l} R: Pref(R) * NormAvPiTx(PCG_i) * \\ \left(1 + (T/P)_R + ((T/P)_{9.6k} + C/P)\left(\frac{Pref\ (9.6k)}{Pref\ (R)}\right)\right) \leq \\ Tx(max)/Headroom\_Req \end{array} \right\}$$

$$NormAvPiTx(PCG_i) = \alpha_{Headroom} \frac{TxPiPwr(PCG_i)}{Pref(Rassigned)} + (1 - \alpha_{Headroom}) \times NormAvPiTx(PCG_{i-1}),$$

where Pref(R) is the "Pilot Reference Level" value specified in the Attribute Gain Table in TIA/EIA-IS-2000.2, TxPiPwr($PCG_i$) is the actual transmit pilot power after power constraints on the MS side are applied in case of power outage, and NormAvPiTx($PCG_i$) is the normalized average transmit pilot power. An MS may be more conservative or aggressive in its choice of headroom and determination of maximum requested rate depending on what is permitted by the BS.

In an embodiment, the MS receives grant information by one of the two following methods:
  Method a: Enhanced supplemental channel assignment mini message (ESCAMM) from BS on 5-ms forward dedicated control channel (F-DCCH) with rate assignment for specified scheduling duration.
  Method b: Enhanced supplemental channel assignment message (ESCAM) from BS on forward physical data channel (F-PDCH) with rate assignment for specified scheduling duration.

The assignment delays depend on the backhaul and transmission delays and are different depending on which method is used for rate grant. During the scheduled duration, the following procedures are performed:
  In an embodiment where R-FCH is used to transmit autonomous data and for outer-loop PC, the MS transmits data at an autonomous rate of 9600 bps if it has some data in its buffer. Otherwise, the MS sends a null R-FCH frame at a rate of 1500 bps.
  The MS transmits at the assigned R-SCH rate in a given 20-ms period if the MS has more data than can be carried on the R-FCH and if the MS has decided that it would have sufficient power to transmit at the assigned rate (keeping headroom for channel variations). Otherwise, there is no transmission on the R-SCH during the frame or the MS transmits at a lower rate which satisfies the power constraint. The MS decides that it has sufficient power to transmit on the R-SCH at the assigned rate R in a given 20-ms period Encode_Delay before the beginning of that 20-ms period if the following equation is satisfied:

$$Pref(R) * NormAvPiTx(PCG_i)$$
$$\left[1 + (T/P)_R + ((T/P)_{R_{PCN}} + (C/P))\left(\frac{Pref(R_{FCH})}{Pref(R)}\right)\right] < \frac{Tx(\max)}{Headroom\_Tx}$$

where Pref(R) is the "Pilot Reference Level" value specified in the Attribute Gain Table in TIA/EIA-IS-2000.2, NormAvPiTx($PCG_i$) is the normalized average transmit pilot power, $(T/P)_R$ is the traffic to pilot ratio that corresponds to rate R and for all channel rates is specified in the Nominal Attribute Gain table in appendix A as Nominal Attribute Gain values, $(T/P)_{R_{FCH}}$ is the traffic to pilot ratio on FCH, (C/P) is the ratio of total power used by the control channels to the pilot power without multichannel gain adjustment, $T_x(max)$ is the maximum MS transmit power, and Headroom_Tx is the headroom the MS keeps to allow for channel variation.

The DTX determination is done once every frame, Encode_Delay PCGs before the R-SCH transmission. If the MS disables transmission on the R-SCH, it transmits at the following power:

$$TxPwr(PCG_i) = PiTxPwr(PCG_i)\left[1 + ((T/P)_{R_{FCH}} + (C/P))\left(\frac{Pref(R_{FCH})}{Pref(R)}\right)\right]$$

An MS encodes the transmission frame Encode_Delay before the actual transmission.

Base Station Procedures

In an embodiment, the BS performs the following essential functions:
  Decoding of R-FCH/R-SCH
  Power control Decoding of R-FCH/R-SCH When there are multiple traffic channels transmitted by the MS simultaneously, each of the traffic channels is decoded after correlating with the corresponding Walsh sequence.

Power-Control

Power control in a CDMA system is essential to maintain the desired quality of service (QoS). In IS-2000, the RL pilot channel (R-PICH) of each MS is closed-loop power controlled to a desired threshold. At the BS, this threshold, called power control set point, is compared against the received Ecp/Nt to generate power control command (closed-loop PC), where Ecp is the pilot channel energy per chip. To achieve the desired QoS on the traffic channel, the threshold at the BS is changed with erasures on the traffic channel, and has to be adjusted when the data rate changes.

Set Point Corrections Occur Due to:
- Outer-loop power control
- Rate Transitions Outer-loop power control: If the R-FCH is present, the power control set point is corrected based on erasures of the R-FCH. If R-FCH is not present, the outer-loop PC is corrected based on erasures of some control channel or R-SCH when the MS is transmitting data.

Rate Transitions: Different data rates on the R-SCH require different optimal set point of the reverse pilot channel. When data rate changes on the R-SCH, the BS changes the MS's received Ecp/Nt by the Pilot Reference Levels (Pref(R)) difference between the current and the next R-SCH data rate. In an embodiment, the Pilot Reference Level for a given data rate R, Pref(R), is specified in the Nominal Attribute Gain Table in C.S0002-C. Since the closed-loop power control brings the received pilot Ecp/Nt to the set point, the BS adjusts the outer loop set point according to the next assigned R-SCH data rate:

$$\Delta = Pref(Rnew) - Pref(Rold)$$

Set point adjustment is done [$\Delta$] PCGs in advance of the new R-SCH data rate if $R_{new} > R_{old}$. Otherwise, this adjustment occurs at the R-SCH frame boundary. The pilot power thus ramps up or down to the correct level approximately in 1 dB step sizes of the closed loop as shown in FIG. 2.

Figure 2:
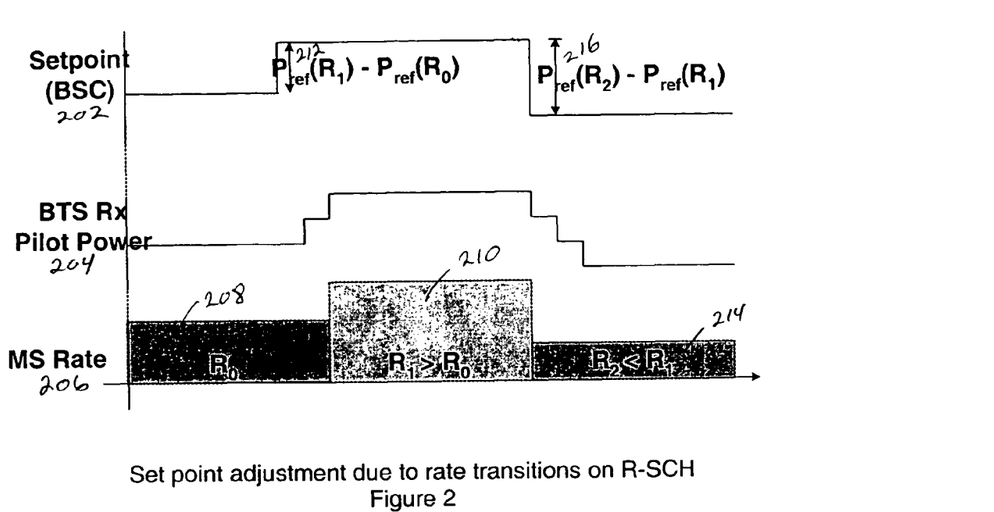
FIG. 2 shows set point adjustment due to rate transitions on R-SCH in accordance with an embodiment.

FIG. 2 shows set point adjustment due to rate transitions on R-SCH in accordance with an embodiment. The vertical axis of FIG. 2 shows a setpoint of a base station controller (BSC) 202, a base transceiver subsystem (BTS) receiver pilot power 204, and the mobile station rate 206. The MS rate is initially at $R_0$ 208. When the R-SCH data rate increases, i.e., R1>R0 210, then the setpoint is adjusted according to $P_{ref}(R_1) - P_{ref}(R_0)$ 212. When the R-SCH data rate decreases, i.e., R2<R1 214, then the setpoint is adjusted according to $P_{ref}(R_2) - P_{ref}(R_1)$ 216.

Scheduler Procedures

A scheduler may be collocated with the BSC, or BTS or at some element in the network layer. A Scheduler may be multilevel with each part responsible for scheduling those MSs that share the lower layer resources. For example, the MS not in soft-handoff (SHO) may be scheduled by BTS while the MS in SHO may be scheduled by part of the scheduler collocated with BSC. The reverse-link capacity is distributed between BTS and BSC for the purpose of scheduling.

In an embodiment, the following assumptions are used for the scheduler and various parameters associated with scheduling in accordance with an embodiment:

1. Centralized Scheduling: The scheduler is co-located with the BSC, and is responsible for simultaneous scheduling of MSs across multiple cells.
2. Synchronous Scheduling: All R-SCH data rate transmissions are time aligned. All data rate assignments are for the duration of one scheduling period, which is time aligned for all the MSs in the system. The scheduling duration period is denoted SCH_PRD.
3. Voice and Autonomous R-SCH transmissions: Before allocating capacity to transmissions on R-SCH through rate assignments, the scheduler looks at the pending rate requests from the MSs and discounts for voice and autonomous transmissions in a given cell.
4. Rate Request Delay: The uplink request delay associated with rate requesting via SCRM/SCRMM is denoted as D_RL(request). It is the delay from the time the request is sent to when it is available to the scheduler. D_RL (request) includes delay segments for over-the-air transmission of the request, decode time of the request at the cells, and backhaul delay from the cells to the BSC, and is modeled as a uniformly distributed random variable.
5. Rate Assignment Delay: The downlink assignment delay associated with rate assignment via ESCAM/ESCAMM is denoted as D_FL(assign). It is the time between the moment the rate decision is made and the time the MS receiving the resultant assignment. D_FL(assign) includes backhaul delay from the scheduler to the cells, over-the-air transmission time of the assignment (based on method chosen), and its decode time at the MS.
6. Available Ecp/Nt Measurement: The Ecp/Nt measurement used in the scheduler shall be the latest available to it at the last frame boundary. The measured Ecp/Nt is reported to the scheduler by the BTS receiver periodically and so it is delayed for a BSC receiver.

Figure 3:
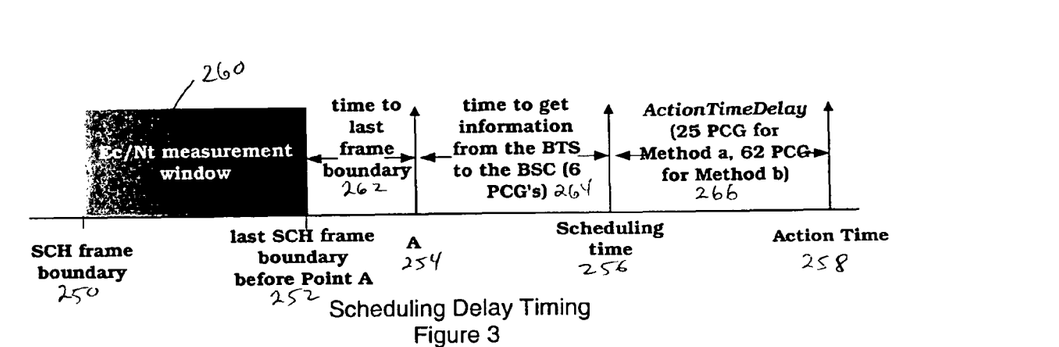
FIG. 3 shows scheduling delay timing in accordance with an embodiment.

FIG. 3 shows scheduling delay timing in accordance with an embodiment. The numbers shown are an example of typical numbers that may be used by a BSC located scheduler though the actual numbers are dependent on backhaul delays and loading scenario of the deployed system.

The horizontal axis shows an SCH frame boundary 250, a last SCH frame boundary before a point A 252, a point A 254, a scheduling time 256, and an action time 258. An Ec/Nt measurement window 260 is shown starting at the SCH frame boundary 250 and ending at the last SCH frame boundary before point A 252. A time to last frame boundary 262 is shown from the last SCH frame boundary before point A 252 to point A 254. A time to get information from the BTS to the BSC (6 PCGs) 264 is shown starting at point A 254 and ending at the scheduling time 256. ActionTimeDelay (25 PCGs for Method a, 62 PCGs for Method b) 266 is shown to start at the scheduling time 256 and ending at the action time 258. Typical values of ActionTimeDelay for Methods a and b are given in Table 1.

Scheduling, Rate Assignment and Transmission Timeline

Scheduling period SCH_PRD refers to the interval after which a scheduler at BTS or BSC or at network level makes a scheduling decision. The scheduler wakes up every SCH_PRD and sends scheduling grants for the next scheduling period. However, the scheduled duration of an MS in a scheduling period is variable. MIN_SCH_DUR is the minimum scheduled duration of an MS and the scheduled duration of an MS is in steps of MIN_SCH_DUR not to exceed the SCH_PRD.

In an embodiment where synchronized scheduling is performed, most events related to request, grant and transmission are periodic with period SCH_PRD.

Figure 4:
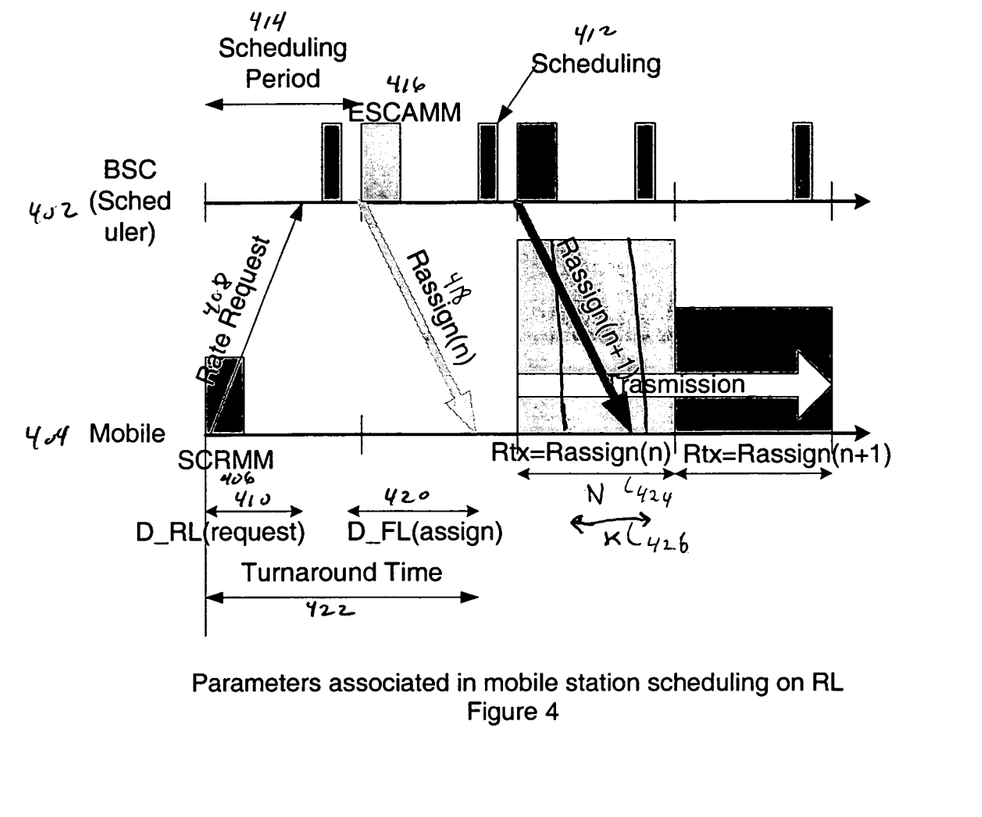
FIG. 4 shows parameters associated in mobile station scheduling on a reverse link.

FIG. 4 illustrates the timing diagram of a rate request, scheduling and rate allocation in accordance with an embodiment. The vertical axes show the time lines for the BSC (scheduler) 402 and the mobile 404. The MS creates an SCRMM 406 and sends a rate request to the BSC (scheduler) 408. The rate request is included in the SCRMM, which is sent on R-FCH. The uplink request delay associated with rate requesting via SCRM/SCRMM is denoted as D_RL(request) 410. A scheduling decision 412 is made once every scheduling period 414. After the scheduling decision 412, an ESCAM/ESCAMM 416 is sent on a forward channel from the BSC to the MS indicating a rate assignment 418. D_FL 420 is the downlink assignment delay associated with rate assignment via ESCAM/ESCAMM. Turnaround time 422 is the time it takes to turnaround a rate request. It is the time from the rate request to rate assignment.

The following characterizes the timeline:
Scheduling Timing
Scheduled Rate Transmissions
Scheduled Rate Durations Scheduling Timing: The scheduler operates once every scheduling period. If the first scheduling decision is performed at $t_i$, then the scheduler operates at $t_i$, $t_i+SCH\_PRD_i$, $t_i+SCH\_PRD_i+SCH\_PRD_{i+1}$ . . . .

Scheduled Rate Transmissions: Given that the MSs have to be notified of the scheduling decisions with sufficient lead time, a scheduling decision has to be reached at Action Time of the ESCAM/ESCAMM message minus a fixed delay, ActionTimeDelay. The corresponding scheduled periods are $\{s_i, s_i+SCH\_PRD_i\}$, $\{s_i+SCH\_PRD_i, s_i+SCH\_PRD_i+SCH\_PRD_{i+1}\}$, $\{s_i+SCH\_PRD_i+SCH\_PRD_{i+1}, s_i+SCH\_PRD_i+SCH\_PRD_{i+1}+SCH\_PRD_{i+2}\}$ . . . where $s_i-t_i$ specifies the ActionTimeDelay. The value of ActionTimeDelay is dependent on where the scheduler is located. If the scheduling level of the multi-level scheduler is at a BSC, ActionTimeDelay is greater than the case when the scheduling level is at a BTS, to ensure that most MSs receive the ESCAM/ESCAMM messages with high probability.

Scheduled Rate Durations: In any scheduled period between $\{s_i, s_i+SCH\_PRD\}$, an MS can have a variable scheduled duration (SCH_DUR). The parameter MIN_SCH_DUR is the minimum scheduled duration of an assignment and SCH_PRD is the maximum duration of the assignment. The SCH_DUR is the variable that is determined at the time of scheduling and changes from one scheduling instant to the other. In an embodiment, SCH_PRD is an integer multiple of MIN_SCH_DUR. Let SCH_PRD/MIN_SCH_DUR=n. Let the consecutive time blocks of MIN_SCH_DUR in a scheduled period be indexed as i=1, 2, . . . , n. An assignment scheduled to start at a jth block can be scheduled to transmit for k consecutive blocks, if j+k−1<=n. Therefore, in a scheduled period $\{s_i, s_i+SCH\_PRD\}$, the MS scheduled duration is from $\{s_i+(j-1)MIN\_SCH\_DUR, s_i+(j-1+k)MIN\_SCH\_DUR\}$. For this assignment, SCH_DUR/MIN_SCH_DUR=k and so in the next scheduling period of duration SCH_PRD, the MS is scheduled to transmit for a duration of SCH_DUR.

Generally, SCH_DUR≦SCH_PRD. In the example shown in FIG. 4, SCH_DUR<SCH_PRD. SCH_PRD 424 comprises N blocks, whereas SCH_DUR 426 comprises k blocks.

Figure 5:
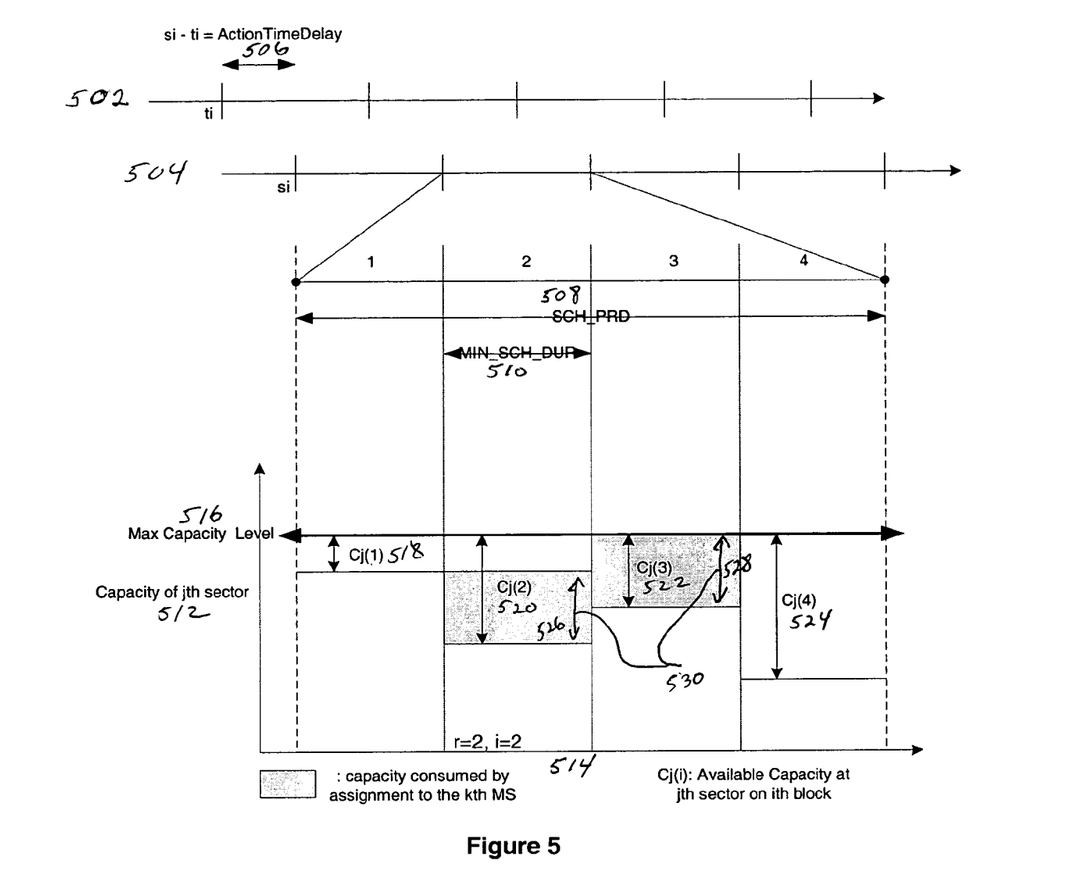
FIG. 5 illustrates the rate determination procedure for MS k in a sector j in accordance with an embodiment.

FIG. 5 illustrates a rate determination procedure for MS k (not to be confused with the k consecutive blocks mentioned above) in the sector j in accordance with an embodiment. FIG. 5 shows variable scheduled durations within a scheduled period. In an embodiment, a scheduler has time-scalable scheduled durations. The scheduled durations change with time depending on the priority of the MS request for transmission, the maximum supportable rate at that time and the mobile station queue estimate. The mobile station queue estimate is an estimate of the amount of data in a queue, i.e. buffer. The maximum supportable rate is based on MS power constraints.

Horizontal axis 502 represents a scheduler timeline where ti denotes the scheduling instants. Horizontal axis 504 represents the start si of an Action Time of a grant. $s_i-t_i$ specifies the ActionTimeDelay 506. The scheduling duration period SCH_PRD 508 is shown to have duration of four times MIN_SCH_DUR 510, i.e., four blocks. The number four is chosen for illustrative purposes. It would be apparent to those skilled in the art that SCH_PRD can be chosen to be any integer other than four that the implementation complexity permits. MIN_SCH_DUR 510 is the minimum scheduled duration of an MS and the scheduled duration of an MS is in steps of MIN_SCH_DUR not to exceed the SCH_PRD 508.

The vertical axis 512 represents capacity of the jth sector and the horizontal axis 514 represents a block of duration MIN_SCH_DUR within a scheduled period. The horizontal line 516 intersecting the axes 512 represents a maximum capacity level that the scheduler is allowed to fill in during the scheduling period 508.

Cj(i) represents available capacity at a jth sector on an ith block. Thus, Cj(1) 518 represents available capacity at a jth sector on the first block. Cj(2) 520 represents available capacity at a jth sector on the second block. Cj(3) 522 represents available capacity at a jth sector on the third block. Cj(4) 524 represents available capacity at a jth sector on the fourth block.

At the instant of scheduling a kth MS 530 in a scheduler priority list, the scheduler scans through different combinations of consecutive blocks so that the MS can transmit maximum amount of data if scheduled. Since the available capacity 518 in the first block permits only small rate assignment, the scheduler may pick the second and third blocks with high rate assignments. It does not assign a rate to the kth mobile station in the fourth scheduling block if the MS doesn't have enough data to transmit.

The shaded areas 526, 528 represent capacity consumed by assignment to the kth MS 530. In the example, there was not enough available capacity at Cj(1) 518 for the capacity used at Cj(2) 520; therefore, the capacity used was at Cj(2) 520. There was enough capacity at Cj(4) 524 for the capacity used at Cj(2) 520 and Cj(3) 522, but there was enough available capacity at Cj(2) 520 and Cj(3) 522 such that none of the available capacity at Cj(4) 524 had to be used. Thus, during the SCH_PRD, only two of the four blocks were used for transmitting.

Scheduler Description and Procedures

The scheduling entity maintains a list of all MSs in the system in the system the entity is responsible of scheduling. It also maintains a list of BSs in each MS's Active Set. Associated with each MS, the scheduler stores estimate of MS's queue size ($\hat{Q}$).

In an embodiment where MS reports queue size in a request message, following series of updates may be used to maintain MS queue estimate. The queue size estimate $\hat{Q}$ is updated after any of the following events happen:

1. A request message is received. As an example, in IS-2000, Supplemental channel request message (SCRM) or Supplemental channel request mini-message (SCRMM] is used to request a rate and report the MS estimate of transmit buffer: $\hat{Q}$ is updated to:

$$\hat{Q} = \text{Queue Size reported in SCRMM}$$

A better estimate can be obtained if the scheduling entity is aware of uplink delays in receiving a request message. It can then adjust for change in MS transmit buffer during the duration in which the request was sent and it was received by the scheduler.

2. After each packet channel decoding:

In IS-2000, Reverse Fundamental Channel (R-FCH) and Reverse Supplemental Channel (R-SCH) are present and can be used to carry data. In such a case after packet decoding, queue estimate is update as specified below:

$$\hat{Q} = \hat{Q} - (Correct_{FCH} \cdot R_{\alpha}(FCH) + Correct_{SCH} \cdot R_{\alpha}(SCH))$$
$$* 20 \text{ ms} + (Correct_{FCH} \cdot PL\_FCH\_OHD + Correct_{SCH} \cdot PL\_SCH\_OHD)$$

where PL_FCH_OHD and PL_SCH_OHD are physical layer overhead on the R-FCH and the R-SCH, respectively; and CorrectSCH and CorrectFCH are indicator functions for the R-SCH and R-FCH, respectively.

$$Correct_{SCH} = \begin{cases} 1 & \text{if } R\text{-}SCH \text{ is received correctly} \\ 0 & \text{if } R\text{-}SCH \text{ is received incorrectly} \end{cases}$$

$$Correct_{FCH} = \begin{cases} 1 & \text{if } R\text{-}FCH \text{ is received correctly} \\ 0 & \text{if } R\text{-}FCH \text{ is received incorrectly} \end{cases}$$

3. At the scheduling instant $t_i$, the scheduler estimates the queue size of the MS at the beginning of the next scheduling grant:

$\hat{Q}(f)=\hat{Q}-(R_{assigned}+9600)\times\lceil\text{ActionTimeDelay}/20\rceil\cdot 20$ ms$+((PL\_FCH\_OHD+SCH_{Assigned}*PL\_SCH\_OHD)\times(\lceil\text{ActionTimeDelay}/20\rceil);$ $\hat{Q}(f)=\hat{Q}-(9600\times20\text{ ms}-PL\_FCH\_OHD)\times\rceil$Action-TimeDelay/20 ms$\rceil(R_{assigned}\times20\text{ ms}-PL\_SCH\_OHD)\times$(RemainingSchDur/20 ms)

where $R_{assigned}$ is the rate assigned on the R-SCH during the current scheduling period and RemainingSchDur is the time left for the MS to transmit on the R-SCH at $R_{assigned}$ rate after the scheduling instant $t_i$.

Scheduling Algorithm

The scheduling algorithm has the following characteristics:
a) prioritization of MS rate requests based on MS requested rate, its queue estimate, throughput allocated and other priority metric,
b) greedy filling for maximum capacity utilization and increasing timre-division multiplex (TDM) gain, and
c) local greedy filling to empty maximum data from the MS buffer. Consider the scheduling algorithm for scheduled duration $\{s, s+\text{SCH\_PRD}\}$ shown below.

FIG. 5 illustrates the rate determination procedure for the MS k at sector j.

Initialization: The MS rate requests are prioritized. Associated with each MS is a priority count PRIORITY. PRIORITY of an MS is updated based on various factors such as channel conditions, estimated queue size in an MS buffer, rate requested and throughput allocated.

1. Let the Load constraint be Load$_j \leq$ max Load, such that the rise-over-thermal overshoot above certain threshold is limited. Let $C_j(r)$ denote the available capacity at sector j in the rth minimum scheduling block $\{s+(r-1)\cdot\text{MIN\_SCH\_DUR}, s+r\cdot\text{MIN\_SCH\_DUR}\}$ (FIG. 5). As a first step, the capacity consumed during SCH_PRD due to pilot transmissions and transmissions on fundamental channels (due to voice or data) is computed and the available capacity in each of the minimum scheduled blocks is updated accordingly. In an embodiment where sector load is used for capacity estimation, the available capacity is updated as below:

$$C_j(r) = \max \text{Load} - \sum_{j\in ActiveSet} \frac{Sinr_j(0, E[R_{FCH}])}{1+Sinr_j(0, E[R_{FCH}])},$$

$\forall r = 1, 2, \ldots n,$ where max Load is the maximum Load for which the rise-over-thermal outage criteria is met. $Sinr_j(R_i, E[R_{FCH}])$ is the estimated Sinr at sector j if the MS is assigned a rate $R_i$ on R-SCH and $E[R_{FCH}]$ is the expected rate of transmission on the R-FCH.

MS rate requests are prioritized in decreasing order of their PRIORITY. Thus, the MSs with highest PRIORITY are at the top of the queue.

2. Set k=1,

3. For d from 1 to n, calculate the maximum rate $R_{max}^k(d)$ the MS can consecutively transmit for d consecutive minimum scheduling blocks under the constraints of available power and available data in the queue. In an embodiment where the MS reports the maximum rate based on its power constraint or the BS is able to estimate the maximum power constraint rate of the MS, the scheduler can determine $R_{max}^k(d)$ from its queue estimate as shown below.

$$R_{max}^k(d) = \min \begin{cases} R_{max}(\text{power}), \\ \underset{R}{\text{argmin}}\{R \mid \hat{Q}(f) \leq (9600\times 20 \text{ ms} - PL\_FCH\_OHD)\times \\ (\text{SCH\_PRD}/20 \text{ ms}) + \\ (R\times 20 \text{ ms} - PL\_SCH\_OHD)\times \\ (i\times\text{MIN\_SCH\_DUR}/20 \text{ ms}) \text{ OR } 307.2 \text{ kbps}\} \end{cases}$$

$R_{max}$(power) is the maximum rate that the MS can support given its power limit. This maximum rate is reported in the last received SCRM/SCRMM message.

4. Based on $R_{max}^k(d)$ (d=1, . . . , n) and available capacity $C_j(r)$ in each of the minimum scheduled block, the assigned rate $R_k(r,d)$ for k-th MS, starting at r-th block and for d consecutive blocks is determined. The chosen value of $R_k*(r*,d*)$ maximizes the data sent in any consecutive interval in the scheduled period $\{s, s+\text{SCH\_PRD}\}$, while choosing the smallest of such an interval to maximize the TDMA gains.

Initialize the MS queue emptied, $Q(e)=0$, $R_k*(r*,d*)=0$.

The following iteration finds $r*d$, and $R_k*(r*,d*)$ that maximize $Q(e)$ while choosing minimum scheduled duration.

---

For d = 1:n,
  If
    $Q(e) < (R_{max}^k(d) \times 20\text{ms} - PL\_SCH\_OHD) \times$
    $(d \times \text{MIN\_SCH\_DUR}/20\text{ms})$
  {

---

For r=1:n−d+1,

Determine if the MS k can be scheduled in the interval $\{s+(r-1)\text{MIN\_SCH\_DUR}, s+(r-1+d)\text{MIN\_SCH\_DUR}\}$.

Define $C_{av}(j)$ as the minimum of the maximum capacity available at sector j in d consecutive blocks starting from the rth block. This is the maximum capacity that the MS can use if it is scheduled at a constant rate for the d consecutive blocks of duration MIN_SCH_DUR. Mathematically, $C_{av}(j)=\min\{C_j(r), C_j(r+1), \ldots, C_j(r+d-1)\}$. The data-only MS at the kth position in the priority list can be assigned a rate $R_k(r,d)$ given by $$R_k(r, d) =$$

$$\min\left\{R^k_{max}(d), \underset{R}{\operatorname{argmax}}\left\{R \left| \begin{array}{l} C_{av}(j) - \dfrac{Sinr_j(R, E[R_{FCH}])}{1 + Sinr_j(R, E[R_{FCH}])} + \\ \dfrac{Sinr_j(0, E[R_{FCH}])}{1 + Sinr_j(0, E[R_{FCH}])} \geq 0; \forall\ j \in ActiveSet(k) \end{array} \right.\right\}\right\}$$

If $Q(e) < (R_k(r,d) \times 20ms - PL\_SCH\_OHD) \times$
$(d \times MIN\_SCH\_DUR/20ms)$ {
   Save: $r^* = r, d^* = d$ and $R^*_k(r^*,d^*) = R_k(r,d)$.
   $Q(e) = (R_k(r,d) \times 20ms - PL\_SCH\_OHD) \times (d \times MIN\_SCH\_DUR/20ms)$ }
  End
}
End The available capacity is updated to:

$$C_j(l) = C_j(l) - \frac{Sinr_j(R_k, E[R_{FCH}])}{1 + Sinr_j(R_k, E[R_{FCH}])} + \frac{Sinr_j(0, E[R_{FCH}])}{1 + Sinr_j(0, E[R_{FCH}])};$$

$\forall j \in ActiveSet(k), \forall l = r, r+1, \ldots, r=d-1$.

5. If $R_{max}^k(1) > 0$ and $R_{k^*(r^*,d^*)} = 0$, increment PRIORITY of the MS Otherwise, do not change PRIORITY of the MS
6. k=k+1; if k<total number of MSs in the list, Go to Step 3, otherwise, stop.

A large n is desirable for compact packing and efficient utilization of capacity. However, as mentioned above, it increases the complexity of the algorithm. So a scheduler implementation can pick different values of SCH_PRD and n and manage this tradeoff differently.

TABLE 1

Baseline specific parameters

| Parameter | Typical Values | Comments |
|---|---|---|
| Headroom_Req | 5 dB | Conservative rate request Keeps power headroom for long-term channel variation Reduces DTX on R-SCH |
| Headroom_Tx | 2 dB | Reduces probability of power outage during the duration of R-SCH transmission |
| Average Tx Power Filter Coefficient $\square_{Headroom}$ | 1/16 | Normalized Average transmit pilot power is computed as filtered version over several PCGs |
| ActionTimeDelay (Method a) | 31.25 ms | Based on the expected ESCAMM delay, including the 2 PCG MS encoding delay |
| ActionTimeDelay (Method b) | 77.5 ms | Based on the expected ESCAM delay on F-PDCH at the primary sector Geometry of −5 dB. This includes the 2 PCG MS encoding delay |

It would be apparent to those skilled in the art that other values can be used for the parameters in table 1. It would also be apparent to those skilled in the art that more or less parameters may be used for a particular implementation.

Those of skill in the art would understand that method steps could be interchanged without departing from the scope of the invention. Those of skill in the art would also understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 6:
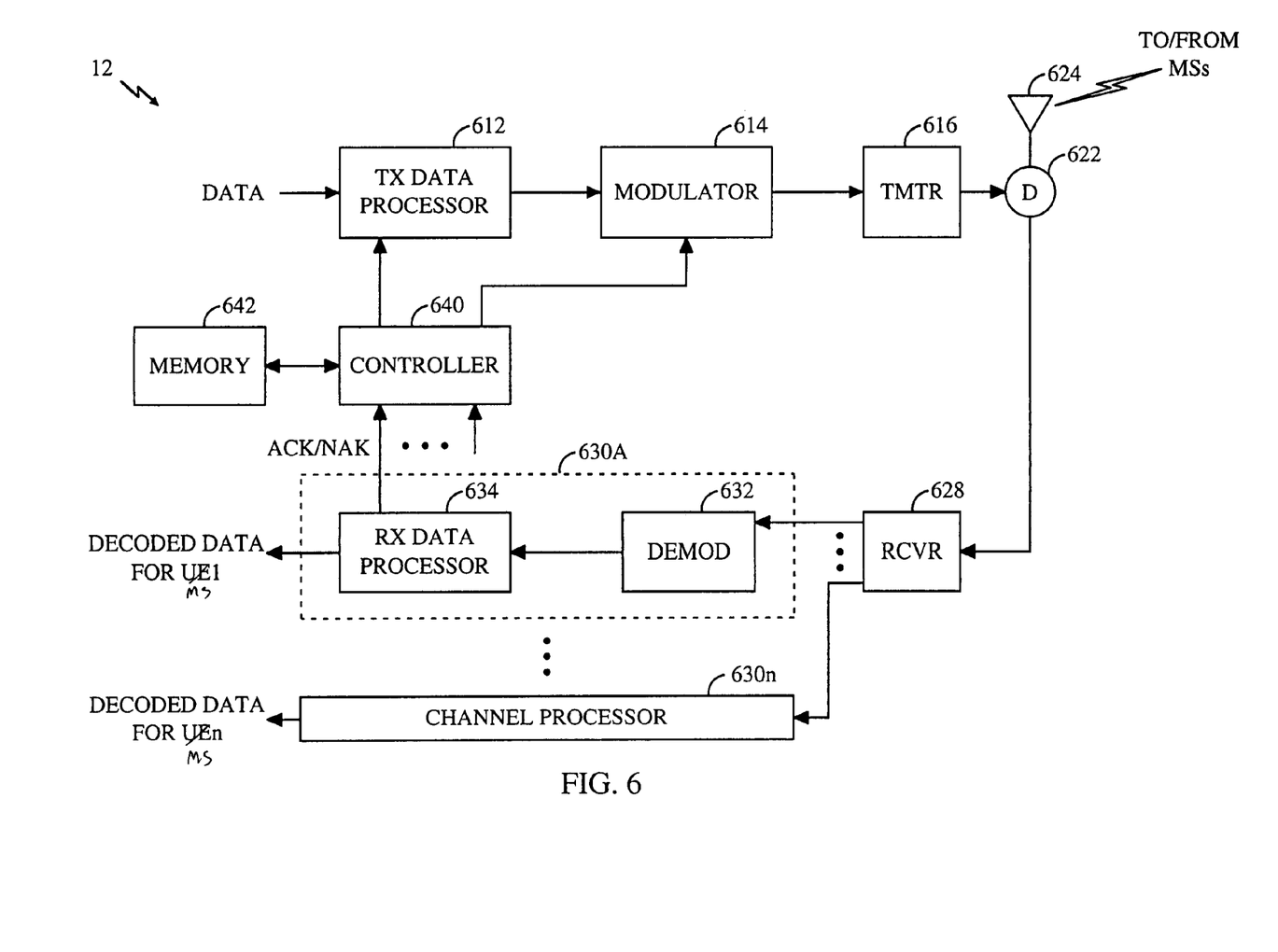
FIG. 6 is a block diagram of a base station in accordance with an embodiment.

FIG. 6 is a block diagram of a BS 12 in accordance with an embodiment. On the downlink, data for the downlink is received and processed (e.g., formatted, encoded, and so on) by a transmit (TX) data processor 612. The processing for each channel is determined by the set of parameters associated with that channel, and in an embodiment, may be performed as described by standard documents. The processed data is then provided to a modulator (MOD) 614 and further processed (e.g., channelized, scrambled, and so on) to provide modulated data. A transmitter (TMTR) unit 616 then converts the modulated data into one or more analog signals, which are further conditions (e.g., amplifies, filters, and frequency upconverts) to provide a downlink signal. The downlink signal is routed through a duplexer (D) 622 and transmitted via an antenna 624 to the designated MS(s).

Figure 7:
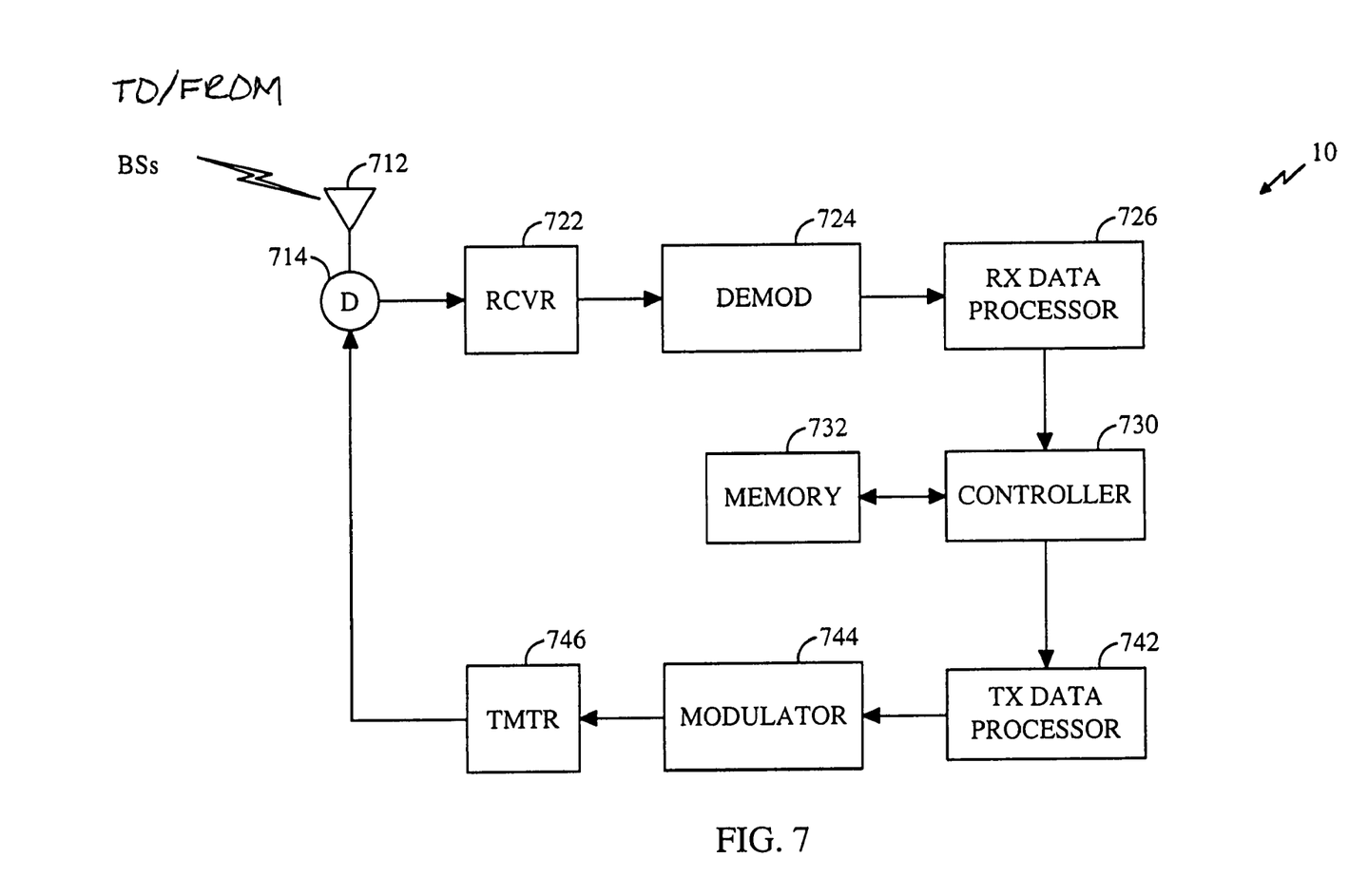
FIG. 7 is a block diagram of a mobile station in accordance with an embodiment.

FIG. 7 is a block diagram of an MS 106 in accordance with an embodiment. The downlink signal is received by an antenna 712, routed through a duplexer 714, and provided to a receiver (RCVR) unit 722. Receiver unit 722 conditions (e.g., filters, amplifies, and frequency downconverts) the received signal and further digitizes the conditioned signal to provide samples. A demodulator 724 then receives and processes (e.g., descrambles, channelizes, and data demodulates) the samples to provide symbols. Demodulator 724 may implement a rake receiver that can process multiple instances (or multipath components) of the received signal and provide combined symbols. A receive (RX) data processor 726 then decodes the symbols, checks the received packets, and provides the decoded packets. The processing by demodulator 724 and RX data processor 726 is complementary to the processing by modulator 614 and TX data processor 612, respectively.

On the uplink, data for the uplink, pilot data, and feedback information are processed (e.g., formatted, encoded, and so on) by a transmit (TX) data processor 742, further processed (e.g., channelized, scrambled, and so on) by a modulator (MOD) 744, and conditioned (e.g., converted to analog signals, amplified, filtered, and frequency upconverted) by a transmitter unit 746 to provide an uplink signal. The data processing for the uplink is described by standard documents. The uplink signal is routed through duplexer 714 and transmitted via antenna 712 to one or more BSs 12.

Referring back to FIG. 6, at BS 12, the uplink signal is received by antenna 624, routed through duplexer 622, and provided to a receiver unit 628. Receiver unit 628 conditions (e.g., frequency downconverts, filters, and amplifies) the received signal and further digitizes the conditioned signal to provide a stream of samples.

In the embodiment shown in FIG. 6, BS 12 includes a number of channel processors 630*a* through 630*n*. Each channel processor 630 may be assigned to process the sample steam for one MS to recover the data and feedback information transmitted on the uplink by the assigned MS. Each channel processor 630 includes a (1) demodulator 632 that processes (e.g., descrambles, channelizes, and so on) the samples to provide symbols, and (2) a RX data processor 634 that further processes the symbols to provide the decoded data for the assigned MS.

Controllers 640 and 730 control the processing at the BS and the MS, respectively. Each controller may also be designed to implement all or a portion of the scheduling process. Program codes and data required by controllers 640 and 730 may be stored in memory units 642 and 732, respectively.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

APPENDIX A

| | | | | | |
|---|---|---|---|---|---|
| | | Reverse Link Nominal Attribute Gain Table (Part 1 of 2) | | | |
| Data Rate (bps) | Frame Length (ms) | Coding | Nominal_ Attribute_ Gain | Pilot_ Reference_ Level | Target Error Rate[1] |
| 1,200 | 80 | Convolutional | −56 | 0 | 0.05 |
| 1,350 | 40 | Convolutional | −54 | 0 | 0.05 |
| 1,500 | 20 | Convolutional | −47 | 0 | 0.01 |
| 1,800 | 20 | Convolutional | −42 | 3 | 0.01 |
| 1,800 | 40 or 80 | Convolutional | −45 | 3 | 0.05 |
| 2,400 | 40 or 80 | Convolutional | −30 | 0 | 0.05 |
| 2,700 | 20 | Convolutional | −22 | 0 | 0.01 |
| 3,600 | 20 | Convolutional | −13 | 3 | 0.01 |
| 3,600 | 40 or 80 | Convolutional | −17 | 3 | 0.05 |
| 4,800 | 20 | Convolutional | −2 | 0 | 0.01 |
| 4,800 | 40 or 80 | Convolutional | −3 | 0 | 0.05 |
| 7,200 | 20 | Convolutional | 15 | 3 | 0.01 |
| 7,200 | 40 or 80 | Convolutional | 10 | 3 | 0.05 |
| 9,600 | 20 | Convolutional | 30 | 0 | 0.01 |
| 9,600 | 40 or 80 | Convolutional | 24 | 0 | 0.05 |
| 9,600 (RC 3 and 5) | 5 | Convolutional | 58 | 0 | 0.01 |
| 9,600 (RC 4 and 6) | 5 | Convolutional | 54 | 3 | 0.01 |
| 14,400 | 20 | Convolutional | 44 | 3 | 0.01 |
| 14,400 | 40 or 80 | Convolutional | 40 | 3 | 0.05 |
| 19,200 | 20, 40, or 80 | Convolutional | 50 | 1 | 0.05 |
| 28,800 | 20, 40, or 80 | Convolutional | 56 | 11 | 0.05 |
| 38,400 | 20, 40, or 80 | Convolutional | 60 | 11 | 0.05 |
| 57,600 | 20, 40, or 80 | Convolutional | 72 | 18 | 0.05 |
| 76,800 | 20, 40, or 80 | Convolutional | 72 | 21 | 0.05 |
| 115,200 | 20, 40, or 80 | Convolutional | 80 | 32 | 0.05 |

APPENDIX A-continued

Reverse Link Nominal Attribute Gain Table (Part 2 of 2)

| Data Rate (bps) | Frame Length (ms) | Coding | Nominal_Attribute_Gain | Pilot_Reference_Level | Target Error Rate |
|---|---|---|---|---|---|
| 153,600 | 20, 40, or 80 | Convolutional | 84 | 36 | 0.05 |
| 230,400 | 20 or 40 | Convolutional | 88 | 46 | 0.05 |
| 259,200 | 80 | Convolutional | 96 | 50 | 0.05 |
| 307,200 | 20 or 40 | Convolutional | 96 | 54 | 0.05 |
| 460,800 | 20 | Convolutional | 104 | 61 | 0.05 |
| 518,400 | 40 | Convolutional | 104 | 64 | 0.05 |
| 614,400 | 20 | Convolutional | 112 | 68 | 0.05 |
| 1,036,800 | 20 | Convolutional | 128 | 83 | 0.05 |
| 4,800 | 80 | Turbo | 2 | 0 | 0.05 |
| 7,200 | 80 | Turbo | 24 | 0 | 0.05 |
| 9,600 | 40 or 80 | Turbo | 34 | 0 | 0.05 |
| 14,400 | 40 or 80 | Turbo | 42 | 0 | 0.05 |
| 19,200 | 20, 40, or 80 | Turbo | 44 | 2 | 0.05 |
| 28,800 | 20, 40, or 80 | Turbo | 52 | 9 | 0.05 |
| 38,400 | 20, 40, or 80 | Turbo | 56 | 10 | 0.05 |
| 57,600 | 20, 40, or 80 | Turbo | 64 | 19 | 0.05 |
| 76,800 | 20, 40, or 80 | Turbo | 68 | 19 | 0.05 |
| 115,200 | 20, 40, or 80 | Turbo | 76 | 29 | 0.05 |
| 153,600 | 20, 40, or 80 | Turbo | 76 | 33 | 0.05 |
| 230,400 | 20 or 40 | Turbo | 88 | 39 | 0.05 |
| 259,200 | 80 | Turbo | 88 | 48 | 0.05 |
| 307,200 | 20 or 40 | Turbo | 88 | 50 | 0.05 |
| 460,800 | 20 | Turbo | 104 | 54 | 0.05 |
| 518,400 | 40 | Turbo | 108 | 56 | 0.05 |
| 614,400 | 20 | Turbo | 112 | 58 | 0.05 |
| 1,036,800 | 20 | Turbo | 125 | 78 | 0.05 |

[1]The error rate is the frame error rate when a single transmission unit is used; otherwise, the Logical Transmission Unit (LTU) error rate is used. This applies to the cases in which the Target Error Rate is 0.05.

What is claimed is:

1. A method of scheduling, comprising:
receiving, by an apparatus, a rate request during a scheduling period;
transmitting, by the apparatus, a rate assignment responsive to the rate request, the rate assignment indicating a scheduled duration and a scheduled rate applicable for the scheduled duration, wherein the scheduled rate determines how many minimum scheduled durations are in the scheduling duration; and
receiving data during a minimum scheduled duration at the scheduled rate,
wherein each minimum scheduled duration is less than or equal to the scheduling period, the scheduling period being an interval of time after transmission of the rate assignment and before the transmission of the next rate assignment.

2. The method of claim 1, wherein the scheduled duration is an integer multiple of a minimum scheduled duration.

3. The method of claim 1, wherein the scheduling period is variable.

4. The method of claim 3, wherein the scheduled rate is variable.

5. The method of claim 1, wherein the scheduled duration is variable.

6. The method of claim 5, wherein the scheduled duration is based on priority of a station.

7. The method of claim 6, wherein the priority of the station is based on channel conditions.

8. The method of claim 6, wherein the priority of the station is based on the rate requested.

9. The method of claim 6, wherein the priority of the station is based on an allocated throughput.

10. The method of claim 5, wherein the scheduled duration is based on a maximum supportable rate.

11. The method of claim 10, wherein the scheduled duration is the longest possible duration for the maximum supportable rate.

12. An apparatus for scheduling data transmissions, comprising:
means for receiving a rate request during a scheduling period;
means for transmitting a rate assignment responsive to the rate request, the rate assignment indicating a scheduled duration and a scheduled rate applicable for the scheduled duration, wherein the scheduled rate determines how many minimum scheduled durations are in the scheduling duration; and
means for receiving data during a minimum scheduled duration at the scheduled rate,
wherein each minimum scheduled duration is less than or equal to the scheduling period, the scheduling period being an interval of time after transmission of the rate assignment and before the transmission of the next rate assignment.

13. A non-transitory computer-readable medium embodying a program of instructions executable by a processor to perform a method of scheduling data transmissions, comprising:
receiving a rate request during a scheduling period;
transmitting a rate assignment responsive to the rate request, the rate assignment indicating a scheduled duration and a scheduled rate applicable for the scheduled duration, wherein the scheduled rate determines how many minimum scheduled durations are in the scheduling duration; and
receiving data during a minimum scheduled duration at the scheduled rate,
wherein each minimum scheduled duration is less than or equal to the scheduling period, the scheduling period being an interval of time after transmission of the rate assignment and before the transmission of the next rate assignment.

14. A base station for scheduling data transmissions, comprising:
an antenna;
a receiver configured to receive a rate request during a scheduling period via the antenna;
a controller configured to determine a rate assignment responsive to the rate request, the rate assignment indicating a scheduled duration and a scheduled rate applicable for the scheduled duration, wherein the scheduled rate determines how many minimum scheduled durations are in the scheduling durations; and
a transmitter configured to transmit the rate assignment,
wherein the receiver is further configured to receive data during a minimum scheduled duration at the scheduled rate,
wherein each minimum scheduled duration is less than or equal to the scheduling period, the scheduling period being an interval of time after transmission of the rate assignment and before the transmission of the next rate assignment.

15. An apparatus for scheduling data transmissions, comprising:
a receiver configured to receive a rate request during a scheduling period;
a controller configured to determine a rate assignment responsive to the rate request, the rate assignment indicating a scheduled duration and a scheduled rate applicable for the scheduled duration, wherein the scheduled rate determines how many minimum scheduled durations are in the scheduling duration; and
transmitter configured to transmit the rate assignment,
wherein the receiver is further configured to receive data during a minimum scheduled duration at the scheduled rate,
wherein each minimum scheduled duration is less than or equal to the scheduling period, the scheduling period being an interval of time after transmission of the rate assignment and before the transmission of the next rate assignment.

16. A method of transmitting data, comprising:
transmitting, by an apparatus, a request for a rate if data arrives in a buffer, data in the buffer exceeds a buffer depth, and sufficient power exists to transmit at the rate requested;
receiving, by the apparatus, a rate assignment responsive to the request for the rate, the rate assignment indicating a scheduled duration and a scheduled rate applicable for the scheduled duration; and
transmitting data, the transmitting responsive to the rate assignment, wherein the data is transmitted for the scheduled duration at the scheduled rate.

17. The method of claim 16, wherein the scheduled duration is an integer multiple of a minimum scheduled duration.

18. The method of claim 16, wherein the scheduled duration is less than or equal to a scheduling period, the scheduling period is an interval of time after a scheduler makes a scheduling decision.

19. The method of claim 18, wherein the scheduling period is variable.

20. The method of claim 19, wherein the scheduled rate is variable.

21. The method of claim 18, wherein the scheduled duration is variable.

22. The method of claim 21, wherein the scheduled duration is based on priority of a station.

23. The method of claim 22, wherein the priority of the station is based on channel conditions.

24. The method of claim 22, wherein the priority of the station is based on an estimate of the amount of data in the buffer.

25. The method of claim 22, wherein the priority of the station is based on the rate requested.

26. The method of claim 22, wherein the priority of the station is based on an allocated throughput.

27. The method of claim 22, wherein the station is a mobile station.

28. The method of claim 21, wherein the scheduled duration is based on a maximum supportable rate.

29. The method of claim 28, wherein the scheduled duration is the longest possible duration for the maximum supportable rate.

30. The method of claim 21, wherein the scheduled duration is based on an estimate of amount of data in the buffer.

31. The method of claim 16, wherein the request for the rate includes an estimate of an amount of data in the buffer, and the scheduled duration in the rate assignment is based on the estimate of the amount of data in the buffer.

32. An apparatus for transmitting data, comprising:
means for transmitting a request for a rate if data arrives in a buffer, data in the buffer exceeds a buffer depth, and sufficient power exists to transmit at the rate requested;
means for receiving a rate assignment responsive to the request for the rate, the rate assignment indicating a scheduled duration and a scheduled rate applicable for the scheduled duration; and
means for transmitting data, the transmitting responsive to the rate assignment, wherein the data is transmitted for the scheduled duration at the scheduled rate.

33. A non-transitory computer-readable medium embodying a program of instructions executable by a processor to perform a method of transmitting data, comprising:
transmitting a request for a rate if data arrives in a buffer; data in the buffer exceeds a buffer depth, and sufficient power exists to transmit at the rate requested;
receiving a rate assignment responsive to the request for the rate, the rate assignment indicating a scheduled duration and a scheduled rate applicable for the scheduled duration; and
transmitting data, the transmitting responsive to the rate assignment, wherein the data is transmitted for the scheduled duration at the scheduled rate.

34. A mobile station for transmitting data, comprising:
a controller configured to generate a request for a rate if data arrives in a buffer, data in the buffer exceeds a buffer depth, and sufficient power exists to transmit at the rate requested;
an antenna;
a transmitter configured to transmit the request for the rate via the antenna; and
a receiver configured to receive a rate assignment responsive to the rate request, the rate assignment indicating a scheduled duration and a scheduled rate applicable for the scheduled duration, wherein the transmitter is further configured to transmit data, the transmitted data responsive to the rate assignment, wherein the data is transmitted for the scheduled duration at the scheduled rate.

35. An apparatus for transmitting data, comprising:
a controller configured to generate a request for a rate if data arrives in a buffer, data in the buffer exceeds a buffer depth, and sufficient power exists to transmit at the rate requested;
a transmitter configured to transmit the request for the rate; and
a receiver configured to receive a rate assignment responsive to the rate request, the rate assignment indicating a scheduled duration and a scheduled rate applicable for the scheduled duration,
wherein the transmitter is further configured to transmit data, the transmitted data responsive to the rate assignment, wherein the data is transmitted for the scheduled duration at the scheduled rate.

* * * * *